Patented Aug. 5, 1952

2,606,129

UNITED STATES PATENT OFFICE 2,606,129

SETTING AND BINDING MATERIAL FROM NATURAL MINERAL ANHYDRITE

Herman Weber, Harriman, Tenn.

No Drawing. Application April 3, 1950, Serial No. 153,757

2 Claims. (Cl. 106—109)

This is a continuation-in-part of my patent application Ser. No. 83,519, filed March 25, 1949.

This invention relates to a non-hydrating setting and binding material and to a process of manufacturing the same. More particularly, the invention relates to a quick setting, non-hydrating composition of matter made from the natural mineral, anhydrous calcium sulphate, or anhydrite. Anhydrite, in its natural state, though finely ground, is incapable of hydrating and setting so as to form a solid cast or body after being mixed with water and allowed to dry. Numerous attempts have been made to treat anhydrite so as to enable it to hydrate and to use such anhydrite for the manufacture of plaster or other materials capable of setting when mixed with water. Such previous attempts have not been commercially successful.

It is an object of this invention to provide a non-hydrating composition of matter made from natural anhydrite capable of setting quickly into a hard, dense mass, if treated with water.

Another object is to provide a method of treating anhydrite so as to produce a non-hydrating, cementitious material capable of setting and forming masses having relatively higher compressive and tensile strength and greater hardness than other hydrating, cementitious materials containing calcium sulphate, e. g., calcined gypsum $(CaSO_4 \cdot \frac{1}{2}H_2O)$.

A further object of this invention is to provide a non-hydrating composition of matter, which utilizes the mineral anhydrite in such a manner that a minimum of treatment and handling of the material will be necessary.

Other objects and characteristics of the process and products, according to my invention, will become apparent from the following description thereof.

I have found that a small amount (3–5%) of slaked lime $(Ca(OH)_2)$ mixed with the starting material, ground to pass 175 mesh screen, produces a basic medium which causes a rapid solution and supersaturation of the anhydrite in the mixing water, resulting, with the evaporation of the water, in a vigorous recrystallization back to the anhydrite, the cause of binding and setting. No hydration of the anhydrite is intended, nor does it occur. This recrystallization is also the reason that the hardness, compression resistance and tensile strength obtained exceed by far the corresponding values for hydrated gypsum plasters.

No other treatment of the starting material is necessary to produce products which set perfectly without hydrating, nor will it be necessary to add metallic salts or sulphates as accelerators to the raw material.

The advantages afforded by this new, non-hydrating setting and binding material of this anhydrite type are apparent from the following examples of products prepared from the same.

*Example 1.*—As a neat mixture usable for inside work in such form as solid, weight-bearing partition blocks, bricks, plates and floors, and as finish coat plaster, etc.:

By weight:
   100 parts ground anhydrite passing 175 mesh screen (5% $Ca(OH)_2$)
   18 parts water

|  | Pounds Per Square Inch After— | |
|---|---|---|
|  | 7 days | 28 days |
| Compression Resistance | 3500+ | 4500+ |
| Tensile Strength | 300+ | 370+ |
| Hardness | 3+ |  |

*Example 2.*—For use as first coat plaster or mortar (1:1):

By weight:
   100 parts ground anhydrite passing 175 mesh (5% slaked lime $(Ca(OH)_2)$
   100 parts fine sand
   40 parts water

|  | Pounds Per Square Inch After— | |
|---|---|---|
|  | 7 days | 28 days |
| Compression Resistance | 1100+ | 1500+ |
| Tensile Strength | 200+ | 250+ |

*Example 3.*—For use as second coat plaster or mortar (1:2):

By weight:
   100 parts ground anhydrite passing 175 mesh (+ 5% slaked lime $(Ca(OH)_2)$
   200 parts fine sand
   45 parts water

|  | Pounds Per Square Inch After— | |
|---|---|---|
|  | 7 days | 28 days |
| Compression Resistance | 600+ | 1200+ |
| Tensile Strength | 80+ | 120+ |

*Example 4.*—For use as base coat plaster or mortar (1:3):

By weight:
   100 parts ground anhydrite passing 175 mesh (+ 5% slaked lime (Ca(OH)₂)
   300 parts fine sand
   50 parts water

|  | Pounds Per Square Inch After— | |
| --- | --- | --- |
|  | 7 days | 28 days |
| Compression Resistance | 300+ | 500+ |
| Tensile Strength | 50+ | 100+ |

Any inorganic material such as rock wool, glass fiber, vermiculite, cinders, etc., can be added for special purposes; also organic materials after mineralizing same with sodium silicate.

I claim:

1. A process of manufacturing an anhydrous setting and binding material from natural anhydrite by recrystallization of the starting material in a basic medium, which consists in grinding the starting material to pass 175 mesh screen, mixing it with 3–5% calcium hydroxide, mixing the resulting material with water, whereby a rapid solution and supersaturation of the anhydrite is performed in the watery solution, and recrystallizing the anhydrite by evaporation of water.

2. A new anhydrous, quick setting composition of matter consisting of mineral anhydrite ground to pass 175 mesh screen and 3–5% slaked lime which in the presence of water yields a basic medium.

HERMAN WEBER.

REFERENCES CITED

The following references are of record in the file of this patent:

UNITED STATES PATENTS

| Number | Name | Date |
| --- | --- | --- |
| 1,470,731 | Hartner | Oct. 16, 1923 |
| 1,972,527 | Lefebure | Sept. 4, 1934 |